(12) United States Patent (10) Patent No.: US 8,659,475 B2
Kubrak et al. (45) Date of Patent: Feb. 25, 2014

(54) METHOD FOR DETECTING THE DISTORTION OF A GNSS SIGNAL

(75) Inventors: Damien Kubrak, Toulouse (FR); Michel Monnerat, Saint Jean (FR)

(73) Assignee: Thales, Neuilly sur Seine (FR)

( * ) Notice: Subject to any disclaimer, the term of this patent is extended or adjusted under 35 U.S.C. 154(b) by 169 days.

(21) Appl. No.: 13/294,041

(22) Filed: Nov. 10, 2011

(65) Prior Publication Data

US 2012/0286993 A1 Nov. 15, 2012

(30) Foreign Application Priority Data

Nov. 12, 2010 (FR) ...................................... 10 04415

(51) Int. Cl.
*G01S 19/20* (2010.01)
(52) U.S. Cl.
USPC ................................................... 342/357.58
(58) Field of Classification Search
USPC ............... 342/357.21, 357.4, 357.46, 357.58; 701/468, 470
See application file for complete search history.

(56) References Cited

U.S. PATENT DOCUMENTS

2004/0189518 A1 9/2004 Brenner
2011/0029277 A1* 2/2011 Chowdhary et al. .......... 702/150

FOREIGN PATENT DOCUMENTS

FR 2818470 A1 6/2002

OTHER PUBLICATIONS

Gabriel Wong et al., "Characterization of Signal Deformations for CPS and WAAS Satellites", 23rd International Technical Meeting of the Satellite Division of the Institute of Navigation, Sep. 24, 2010, pp. 3143-3151, XP002641795.
Sanjeev Gunawardena, "Development of a Transform-Domain Instrumentation Global Positioning System Receiving for Signal Quality and Anomalous Event Monitoring", http://etd.ohiolink.edu/send-pdf.cgi/Gunawardene/%20Sanjeev.pdf?ohiou1178558967; Jun. 30, 2007, pp. 82-105, XP002641796.
M.K. Hasan et al., "Autocorrelation Model-Based Identification Method for ARMA System in Noise", IEEE Proceedings: Vision, Image and Signal Processing, Institution of Electrical Engineers, Oct. 7, 2005, pp. 520-526, vol. 152, No. 5, XP006024997.

* cited by examiner

*Primary Examiner* — Dao Phan
(74) *Attorney, Agent, or Firm* — Baker Hostetler LLP

(57) ABSTRACT

A method for detecting the distortion of a GNSS signal transmitted by at least one GNSS satellite and received by at least one GNSS receiver is disclosed, where the distortion is caused by a GNSS signal generation defect. Initially, at least one autoregressive parametric model of the GNSS signal is determined at the output of a correlation stage of the GNSS receiver. Next, at least one linear prediction error e(n) between the output signal of the correlation stage and the autoregressive parametric model is computed. The linear prediction error is compared to a detection threshold and the distortion of the transmitted GNSS signal is decided when the linear prediction error exceeds the detection threshold.

10 Claims, 1 Drawing Sheet

METHOD FOR DETECTING THE DISTORTION OF A GNSS SIGNAL

CROSS-REFERENCE TO RELATED APPLICATION

This application claims priority to foreign French patent application No. FR 1004415, filed on Nov. 12, 2010, the disclosure of which is incorporated by reference in its entirety.

FIELD OF THE INVENTION

The field of the invention relates to the satellite positioning and/or radio navigation systems commonly referred to as GNSS (global navigation satellite system) systems. In particular, the invention is applicable to the known GNSS systems GPS ("global positioning system") and GALILEO.

More specifically, the field of the invention is that of augmentation systems of the GNSS systems which make it possible to use GNSS signals transmitted by the satellites even when their integrity is modified.

BACKGROUND

The signal transmitted by a GNSS satellite may be affected by random errors which lead to a distortion of the signal so that it does not conform to the specifications of the system. Such errors concern, for example, a random modification of the period of the spreading codes which results in a stationarity break in the signal or even the presence of ripples which modify the square shape, characteristic of a signal modulated by a spreading code, expected at the output of the signal generator.

Such errors are linked to the implementation of the transmitter on board the satellite and in particular to the defects in the equipment items which are not perfect.

The measurements performed on a non-compliant GNSS signal affected by such defects are subject to errors and will result in an incorrect positioning of the GNSS receiver which uses this signal. It is therefore important to be able to detect such errors in order to alert the receiver to the non-conformity of the signal that it is using and to avoid positioning or navigation errors which can have critical consequences.

Hereinafter, the expression "evil waveform" signals will be used to designate GNSS signals affected by errors or distortions which are the consequence of defects in the hardware equipment items on board the satellite.

The known solutions that are used to detect "evil waveform" signals are often based on the use of the correlation function at the output of the integrators of the GNSS receiver. The main drawback of this technique is that it does not differentiate the errors arising from the imperfections of the transmitter on board the satellite and those arising from the multiple paths linked to the reflections of the signal on the different layers of the ionosphere. Also, these techniques are highly sensitive to the ambient noise. The errors associated with the transmission of the signal can be corrected by appropriate processing functions and must be dissociated from the errors introduced from the generation of the signal.

SUMMARY OF THE INVENTION

The present invention proposes to overcome the limitations of the prior art using a solution based on the modelling of the GNSS signal and a linear prediction computation that makes it possible to detect the intrinsic distortions of the signal and to raise an alert, for example through an augmentation system, to invalidate the pseudo-distance measurements performed on this signal in order to determine positioning information.

The invention notably offers the advantages of limiting the false alarms associated with transmission error detections and of being more robust to noise.

To this end, the subject of the invention is a method for detecting the distortion of a GNSS signal transmitted by at least one GNSS satellite and received by at least one GNSS receiver, said distortion being caused by a GNSS signal generation defect, said method being characterized in that it comprises at least the following steps:
- a step for determining at least one autoregressive parametric model of the GNSS signal at the output of a correlation stage that said GNSS receiver includes,
- a step for computing at least one linear prediction error e(n) between said output signal of the correlation stage and said autoregressive parametric model,
- at least one step for comparing the linear prediction error to a detection threshold,
- a step for deciding on the distortion of the transmitted GNSS signal in the case where the linear prediction error exceeds said detection threshold.

In a particular aspect of the invention, the autoregressive parametric model is obtained by applying one of the following methods: covariances method, modified covariances method, Yule Walker's method.

In another particular aspect of the invention, the computation of the linear prediction error e(n) is performed at least using the following relationship:

$$e(n) = x(n) - \hat{x}(n) = x(n) - \sum_{k=1}^{p} a_k x(n-k),$$

in which $a_k$ are the coefficients of the autoregressive model and x(n) are the samples of the signal at the output of the correlation stage.

In another particular aspect of the invention, the linear prediction error e(n) is averaged over a given period before comparison to the detection threshold.

Also the subject of the invention is a GNSS receiver comprising at least one antenna suitable for receiving a GNSS signal, analogue-digital conversion radio means, a correlation stage, signal processing means delivering at their output positioning or navigation information, characterized in that it also comprises means suitable for executing the method for detecting the distortion of said GNSS signal according to the invention.

BRIEF DESCRIPTION OF THE DRAWINGS

Other features and advantages of the invention will become apparent from the following description given in light of the appended drawings which represent.

DETAILED DESCRIPTION

Figure 1:
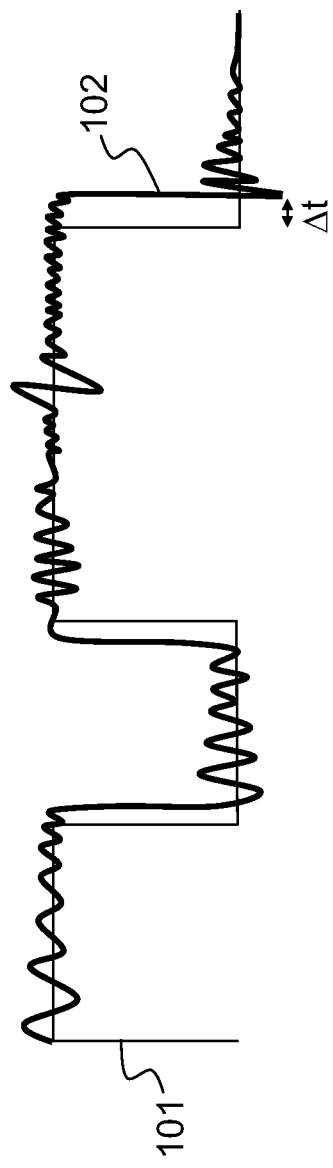
FIG. 1, an illustration of two examples of distortion affecting a GNSS signal,
FIG. 2, a block diagram of a GNSS receiver according to the invention.

FIG. 1 diagrammatically represents a perfect GNSS signal portion 101 which consists of a succession of time slots for which the repetition period is known and determined by the spreading code associated with the transmitted signal. FIG. 1 shows, by superimposition, an imperfect GNSS signal 102 or "evil waveform" signal distorted relative to the perfect signal 101. The distortions notably take two forms. A first distortion of the period of the spreading code engenders a time shift Δt between the received signal 102 and the signal 101. This time shift will lead to a shift between the measured correlation peak and the one that should actually be observed and thus induce an error at the instant of reception of the signal transmitted by the satellite.

A second distortion in the form of ripples of the signal 102 engenders errors notably on the measurements performed on the correlation function used to compute the pseudo-distances between the receiver and the satellites and then create, by triangulation, positioning information. Such ripples result in an asymmetrical and distorted correlation function which also raises problems in estimating the correlation peak which indicates the instant of reception of the signal transmitted by the satellite.

The abovementioned distortions have an impact on the integrity of the GNSS signal. The aim of the invention is notably to detect the abovementioned two types of distortion, but it is also applicable to any type of distortion affecting the integrity of the GNSS signal and resulting from a signal generation defect on board the satellite.

Figure 2:
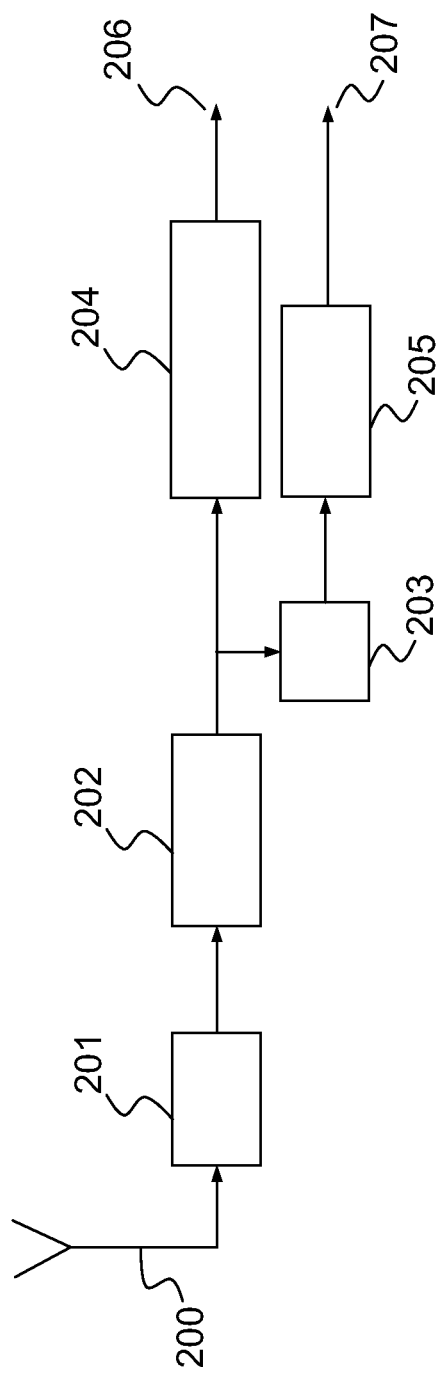

FIG. 2 diagrammatically represents an exemplary architecture of a GNSS receiver according to the invention. An antenna 200 receives one or more GNSS signals transmitted by one or more satellites of a GNSS constellation (not represented). The analogue signal picked up by the antenna 200 is processed by radio processing means 201 to convert this analogue signal into a digital signal. Means 202 for integrating the digital signal and for correlating the signal with a known spreading code produce a signal $S_c$ at the output which is used by signal processing means 204 which produce, as output, positioning, speed or navigation information 206. The receiver according to the invention also includes linear prediction error computation means 203, applied to the output signal $S_c$ of the integration and correlation means 202. The linear prediction error is then supplied as input to an error detector 205 which produces, at its output, information 207 on the distortion of the signal and its non-conformity to the specifications of the GNSS system. This information can be transmitted to an augmentation system of the GNSS system (not represented in the figure), for example the EGNOS system, in order to alert other GNSS receivers as to the non-conformity of the transmitted GNSS signal.

In order to be able to detect the defects affecting the received GNSS signal, firstly, a mathematical model of the signal at the output of the integration and correlation means 202 has to be created. Since the expected form of such a signal is known, it is possible to construct an autoregressive mathematical model using generation methods known to those skilled in the art. For example, a covariances, modified covariances or even a Yule Walker's method can be used to create such a model from the known and expected characteristics of a specified GNSS signal. Any known method that makes it possible to determine a parametric autoregressive model of a signal from its characteristics can be envisaged. The autoregressive model is defined, notably, by a number p of coefficients $a_k$. The variable p designates the order of the autoregressive model. Once this model is defined, the method according to the invention consists, in a first step, in computing the linear prediction error between the signal at the correlation output and the autoregressive model. The linear prediction error computation is performed, for example, by executing the following relationship:

$$e(n) = x(n) - \hat{x}(n) = x(n) - \sum_{k=1}^{p} a_k x(n-k)$$

with x being the signal to be analysed at the correlation output, x(n) being a sample of this signal obtained at an instant n and $\hat{x}$ being the signal obtained from the autoregressive modelling. The instantaneous error e(n) is then possibly averaged over a given time period in order to produce an average linear prediction error E. The average can also be produced by using a sliding window. The instantaneous error e(n) can also be continuously monitored in order to detect local imperfections in the signal.

In a next step, the linear prediction error, instantaneous or averaged over a given period, is compared to one or more detection thresholds in order to determine whether the GNSS signal is affected by errors and is unusable. The detection thresholds are determined by simulation so as to minimize the probability of false alarms and maximize the probability of detecting defects associated with the generation of the signal or with the imperfections of the transmitter ("evil waveform" signal).

In a variant embodiment of the invention, a number of autoregressive models can be generated in order to take account of amplitude variations or of delays applied to the perfect signal at the correlation output. These amplitudes and delays reflect the distortion of the signal relative to the perfect signal which should be transmitted and are taken into account to generate models that are as close as possible to the actual forms of the degraded signals to be detected. A number of linear prediction errors are thus computed and compared to distinct detection thresholds.

The invention claimed is:

1. A method for detecting distortion of a GNSS signal transmitted by at least one GNSS satellite and received by at least one GNSS receiver, said distortion being caused by a GNSS signal generation defect, the method comprising:

determining at least one autoregressive parametric model of the GNSS signal at the output of a correlation stage included in said GNSS receiver;

computing at least one linear prediction error e(n) between an output signal of the correlation stage and said at least one autoregressive parametric model;

comparing the at least one linear prediction error e(n) to a detection threshold; and determining the distortion of the GNSS signal when the at least one linear prediction error exceeds said detection threshold, wherein the determining of the at least one autoregressive parametric model, the computing, the comparing, and the determining of the distortion are performed by the least one GNSS receiver.

2. The method for detecting the distortion of the GNSS signal according to claim 1, wherein the at least one autoregressive parametric model is obtained by applying a covariances method, a modified covariances method, or a Yule Walker's method.

3. The method for detecting the distortion of the GNSS signal according to claim 1, wherein the computation of the at least one linear prediction error e(n) is performed at least using the following relationship:

$$e(n) = x(n) - \hat{x}(n) = x(n) - \sum_{k=1}^{p} a_k x(n-k),$$

in which $a_k$ are coefficients of the at least one autoregressive model comprising a p number of coefficients, and x(n) are samples of the GNSS signal at the output of the correlation stage.

4. The method for detecting the distortion of the GNSS signal according to claim 1, wherein the at least one linear prediction error e(n) is averaged over a given time period before being compared to the detection threshold.

5. The method for detecting the distortion of the GNSS signal according to claim 1, wherein the distortion of the GNSS signal is transmitted to an availability augmentation system.

6. A GNSS receiver, comprising:
at least one antenna suitable for receiving a GNSS signal,
analogue-digital conversion radio means,
a correlation stage,
signal processing means for delivering positioning or navigation information, and
means for executing the method for detecting the distortion of said GNSS signal according to claim 1.

7. A GNSS receiver, comprising:
at least one antenna suitable for receiving a GNSS signal,
analogue-digital conversion radio means,
a correlation stage,
signal processing means for delivering positioning or navigation information, and
means for executing the method for detecting the distortion of said GNSS signal according to claim 2.

8. A GNSS receiver, comprising:
at least one antenna suitable for receiving a GNSS signal,
analogue-digital conversion radio means,
a correlation stage,
signal processing means for delivering positioning or navigation information, and
means for executing the method for detecting the distortion of said GNSS signal according to claim 3.

9. A GNSS receiver, comprising:
at least one antenna suitable for receiving a GNSS signal,
analogue-digital conversion radio means,
a correlation stage,
signal processing means for delivering positioning or navigation information, and
means for executing the method for detecting the distortion of said GNSS signal according to claim 4.

10. A GNSS receiver, comprising:
at least one antenna suitable for receiving a GNSS signal,
analogue-digital conversion radio means,
a correlation stage,
signal processing means for delivering positioning or navigation information, and
means for executing the method for detecting the distortion of said GNSS signal according to claim 5.

* * * * *